H. V. MARCHANT.
Stove-Pipe-Thimble.

No. 129,575.

Patented July 16, 1872.

Witnesses.

Harry King.
H. W. Dodge.

Inventor.

H. V. Marchant
by his Att'ys.
Dodge & Son.

UNITED STATES PATENT OFFICE.

HENRY V. MARCHANT, OF MILWAUKEE, WISCONSIN.

IMPROVEMENT IN STOVE-PIPE THIMBLES.

Specification forming part of Letters Patent No. 129,575, dated July 16, 1872.

SPECIFICATION.

*To all whom it may concern:*

Be it known that I, HENRY V. MARCHANT, of Milwaukee, in the county of Milwaukee and State of Wisconsin, have invented certain Improvements in Stove-Pipe Thimbles, of which the following is a specification, reference being had to the accompanying drawing.

My invention relates to an improvement in the thimble for which Letters Patent were granted to Thomas K. Anderson February 16, 1864; and it consists in forming one of the heads or rings with a flat face, sunken or depressed within the end of the outer cylinder, whereby I am enabled to make the inner cylinder of the same width of metal as the outer one, to turn the edge or flange of the inner cylinder over at a right angle, and to employ a flat disk as a cover to close the thimble.

Figure 1:
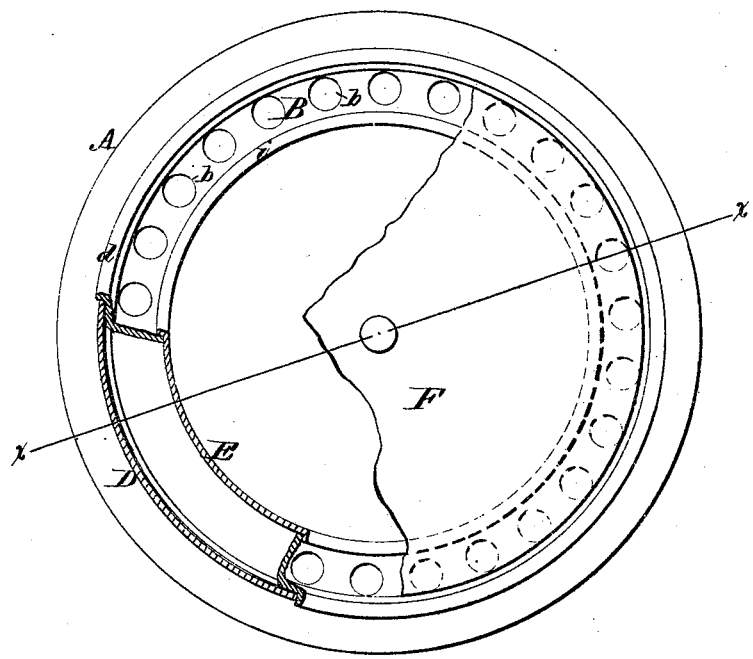
Figure 2:
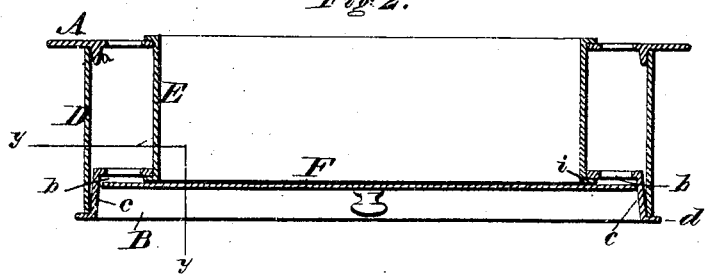

Figure 1 is an end or face view of my improved thimble with a cover applied thereto, a portion of each being broken away in order to show the construction more clearly; and Fig. 2 is a cross-section of the thimble and cover.

A represents one of the heads or rings, made in the usual flat form, with a flange, *a*, on one side to hold the outer cylinder in place. B represents my improved head or ring, having its flat face *b* made of the proper diameter to fit within the outer cylinder of the thimble, and provided around its outer edge with a rim or flange, *c*, which extends forward at a right angle to the face *b*, and has its front edge turned slightly outward to form a flange or lip, *d*, to rest against the end of the outer cylinder. D is the outer cylinder, having one end fitted against the head A in the usual manner, and the other fitted over or around the head B, against the lip *d*. The head B thus applied has its flat face *b* sunken or depressed within the end of the outer cylinder, as shown. E is the inner cylinder, which has its ends inserted through the heads or rings, and its edges *i* turned outward against their faces, so as to hold the various parts of the thimble together in the usual manner.

By depressing the flat face of the head B, as shown, I bring the bearings of the inner cylinder nearer together than those of the outer one, and am thereby enabled to form the two cylinders of the same width of metal, which is considered a great object when manufacturing the thimbles, on a large scale.

By making the depressed face flat I permit the edge or flange of the inner cylinder to be turned over at a right angle, so as to hold firmly and form a neat finish, and also allow the end of the thimble to be closed by means of a simple flat disk or cover, F, as shown.

I am aware that a patent was granted to C. A. Buttles November 7, 1871, in which a conical head was used and the two cylinders were made of the same width of metal; but when the conical head is used the flange of the inner cylinder can only be turned over at about an angle of forty-five degrees, and therefore it frequently allows the head to work loose. Besides, when the conical head is used it necessitates the use of a necked cover or stopper to close it tightly, while in my head a plain flat cover will answer the same purpose. It is obvious that both heads may be made of my improved form, if desired.

Having thus described my invention, what I claim is—

A stove-pipe thimble having one or both of its annular heads formed with a right-angled recess on its outer face, whereby the cover is held therein, substantially as set forth.

HENRY V. MARCHANT.

Witnesses:
  G. McWHORTER,
  ISAAC S. CLARK.